July 6, 1965  R. C. CRUZAN  3,192,783
ENGINE
Filed Sept. 28, 1962  2 Sheets-Sheet 1
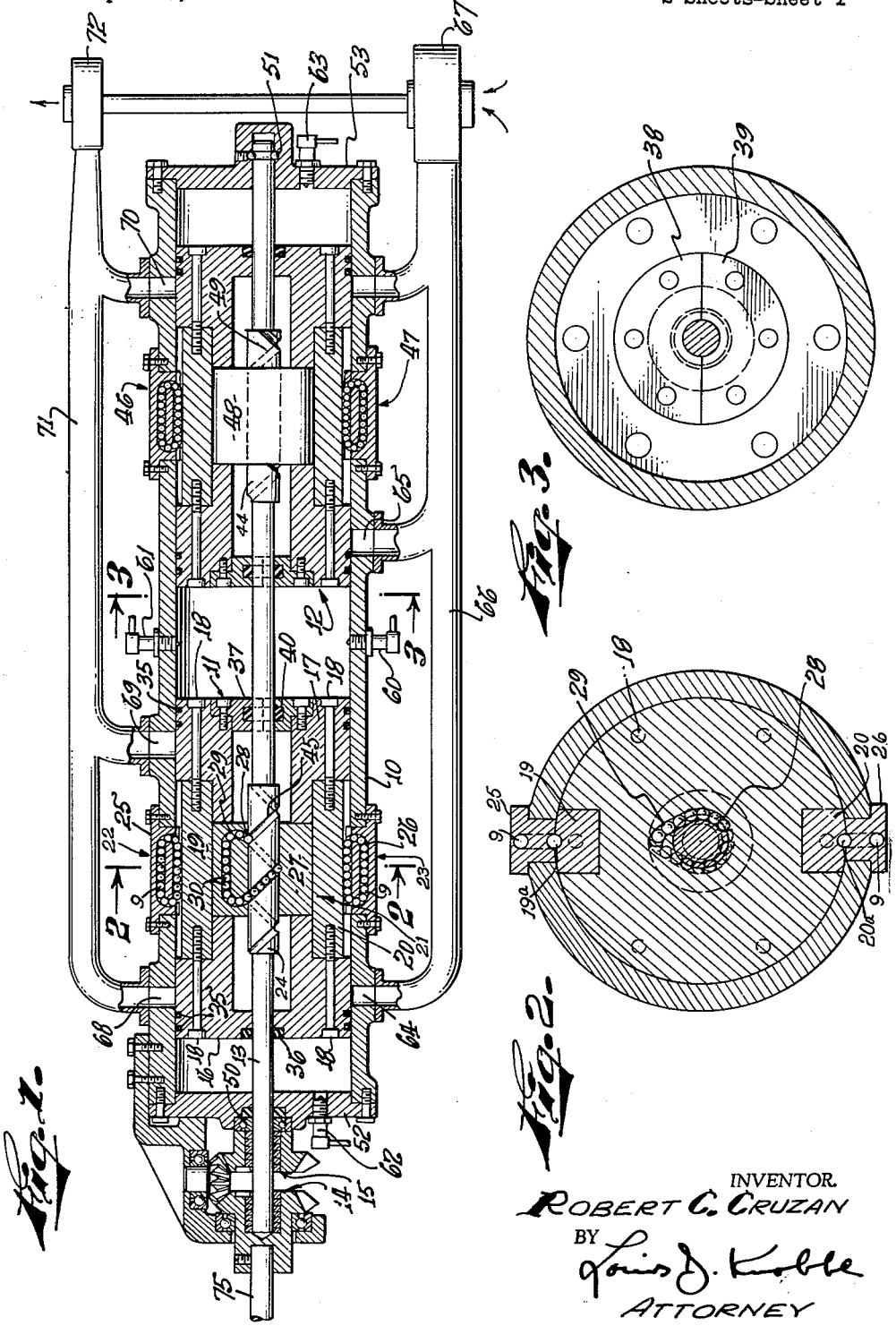
INVENTOR.
ROBERT C. CRUZAN
BY Louis D. Knoble
ATTORNEY July 6, 1965   R. C. CRUZAN   3,192,783
ENGINE
Filed Sept. 28, 1962   2 Sheets-Sheet 2
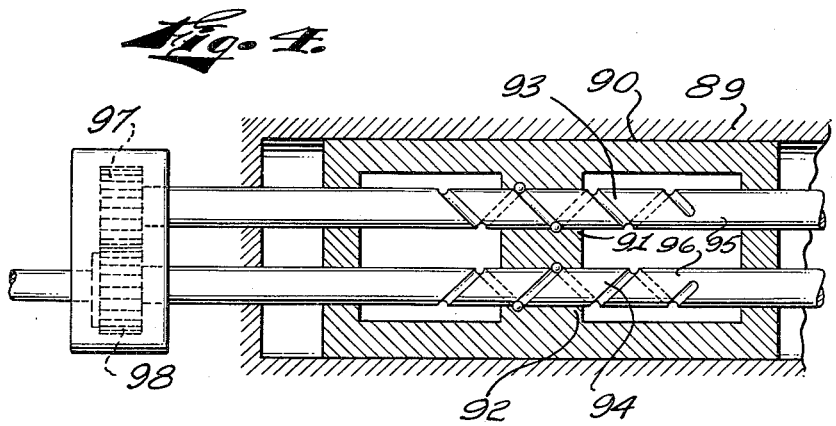
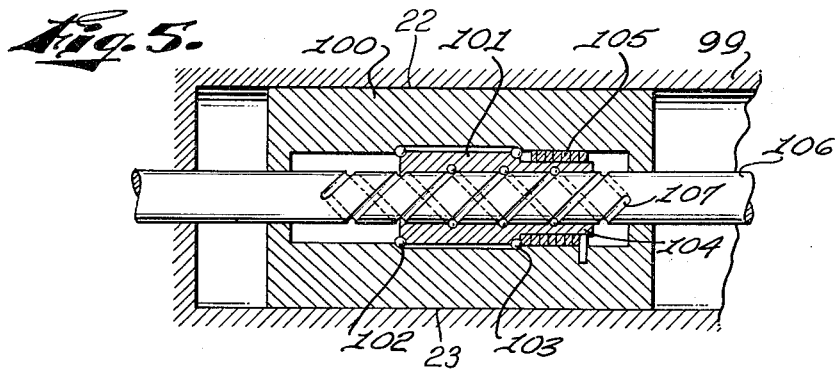
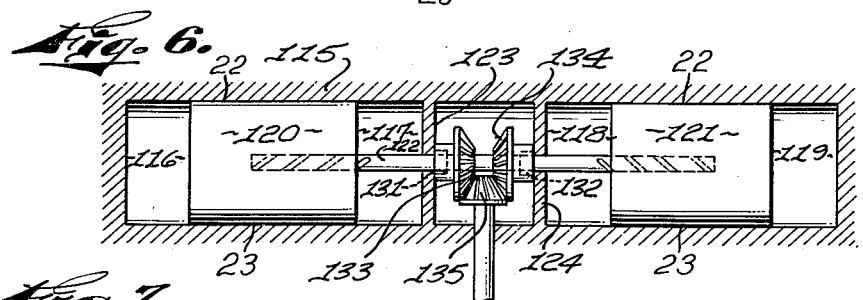
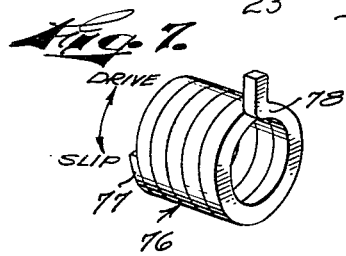
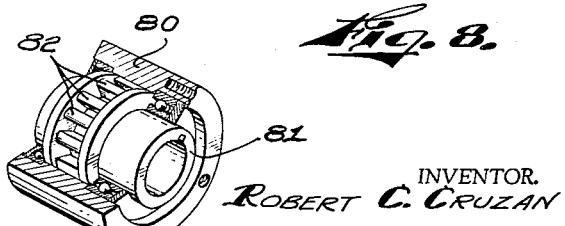
INVENTOR.
ROBERT C. CRUZAN
BY
ATTORNEY

3,192,783
ENGINE
Robert C. Cruzan, 1801 W. Lorella Ave., La Habra, Calif.
Filed Sept. 28, 1962, Ser. No. 226,819
8 Claims. (Cl. 74—89)

The present invention relates to reciprocating engines and, more particularly, a reciprocating engine which does not require a crank shaft assembly.

Heretofore, reciprocating engines not incorporating a crank shaft assembly have been generally unsuccessful due largely to the excessive wear and friction introduced by the mechanism which converts the translatory piston motion to rotary output motion.

It is, accordingly, an object of the present invention to provide an improved reciprocating engine characterized by low frictional losses while avoiding the crank shaft assembly.

Another object of this invention is to provide an improved reciprocating engine of durable construction and low maintenance of operation while avoiding the use of a crank shaft assembly.

A further object of the present invention is to provide a reciprocating engine of greatly simplified construction.

Still another object of this invention is to provide a more compact and lower weight reciprocating engine for a given power output that is presently known in the art.

Other and further objects, features and advantages of the invention will become apparent as the description proceeds.

Briefly, in accordance with a preferred form of the present invention, a pair of reciprocating pistons are mounted within a unitary cylinder. The pistons include respective right and left hand recirculating ball nuts which engage respective ball screw portions of a common shaft rotatably mounted within and without the cylinder. As the pistons reciprocate back and forth within the cylinder, the respective ball bearing screws cause a reciprocating rotary motion of the shaft. This shaft motion may be used directly as the output of the engine or may be connected to a pair of one-way clutches for providing rotary motion in a single direction only. In a preferred embodiment, the engine operates as a two stroke cycle, blower scavenged, solid fuel injection, compression ignition engine. Alternative driving means include steam, compressed gas or spark ignition internal combustion.

Engines constructed in the manner described above and in accordance with other embodiments described hereinafter have substantially lower frictional losses than previous reciprocating engines not employing the conventional crank shaft. Moreover, the engines are of compact, low weight construction and offer a long life with low maintenance costs.

A more thorough understanding of the invention may be obtained by a study of the following detailed description, taken in connection with the accompanying drawings in which:

FIG. 1 is a side elevation view, partly in section of an engine constructed in accordance with this invention;

FIG. 2 is a sectional view taken along line 2—2 of FIG. 1;

FIG. 3 is a sectional view taken along line 3—3 of FIG. 1;

FIGS. 4, 5 and 6 illustrate respective alternative embodiments of engines constructed in accordance with this invention; and FIGS. 7 and 8 are perspective views of particular types of clutches which may be employed in the several embodiments of the invention.

Referring now to FIGURES 1, 2 and 3, there is shown an opposed, double acting two stroke reciprocating engine comprising a longitudinal unitary cylinder 10 usually constructed of a metal such as cast iron in which are slidably mounted opposed pistons 11 and 12. Translation of these pistons in the cylinder by internal combustion, steam or compressed gas causes rotation of drive shaft 13 which is rotatably driven in alternate directions according to the direction of motion of the pistons. This bi-directional rotation of the shaft is converted to rotation in a unitary direction by the opposed over-running or one-way clutches 14 and 15 driven by alternate rotations of the shaft.

Each of the pistons 11 and 12 are constructed in a substantially identical manner, piston 11 comprising generally cylindrical end portions 16, 17 with a reduced radii intermediate section 21 therebetween. End portions 16, 17 form opposite faces of the piston 11 and are constructed of, for example, cast iron or aluminum. These end portions 16, 17 are fastened by bolts 18 to each other and to steel or other hard metal inserts 19 and 20 which form a part of respective recirculating ball splines 22 and 23. These splines 22, 23 include a plurality of ball bearing 9 which recirculate in arcuate grooves 19a, 20a formed in the respective inserts 19, 20 and in recirculation conduits in the assembly 25, 26 attached to the housing wall (see FIGURES 1 and 2). These members are preferably formed of steel. These two part splines 22, 23 provide a low friction means for preventing rotation of the piston 11 with respect to the cylinder 10. Although two splines are shown, it will be apparent that three or more splines may be spacially positioned for achieving a like purpose.

The piston 11 further includes a ball nut 27 coaxially mounted within the piston between the inner faces of respective piston end portions 16 and 17 and more or less in a common transverse plane with the location of the spline 22, 23 described above. Ball nut 27 includes an inwardly threaded helical groove 28 connected at opposite ends to a recirculation conduit 29. A plurality of ball bearings 30 are mounted in the helical groove and conduit so as to be substantially continuous throughout the total length thereof. As described below, these balls engage the groove 45 of the ball screw portion 24 of the shaft 13 to form a ball bearing screw.

Piston 11 further incorporates a pair of annular piston rings 35 at both ends thereof which may be constructed in a manner well known in the art. Also mounted to the piston and coaxial therewith is a pressed seal 36 and a seal 37. In order to conveniently assemble the piston, the seal 37 comprises split keepers 38, 39 (FIG. 3) which support a metallic packing 40 or alternatively a high temperature O ring seal.

Shaft 13 includes a helically grooved ball screw portion or enlarged intermediate shoulder 24 having grooves 45 corresponding to the internal threads 29 of the ball nut 27. Accordingly, the ball nut 27 and the threaded portion 45 of the shaft cooperate to provide a ball bearing screw wherein the ball bearings 30 are retained in rolling engagement or rolling frictional contact between the threads of the shaft 13 and the internal threads of the screw nut 27.

Piston 12 is constructed in a substantially identical manner to piston 11. Accordingly, piston 12 includes respective ball splines 46, 47 for preventing rotation of piston 12 relative to the cylinder 10 and a ball nut 48 cooperating with a helically threaded portion 49 of the shaft 13 to form a ball bearing screw. The desired opposed operation of the pistons is accomplished by providing respectively opposite threads on the ball bearing screws of the respective cylinders. Ball nut 27 and threaded portion 22 of shaft 13 are therefore provided with a right-hand thread 45, whereas ball nut 48 and the threaded portion 49 of shaft 39 are provided with a left-hand thread 44.

Shaft 13 is journaled in respective bearings 50, 51 coaxially mounted with the cylinder 10 upon respective end plates 52, 53. As shown, bearing 50 may be a ball bearing and bearing 51 may incorporate a ball type retainer ring for supporting thrust in both directions.

The engine of FIGS. 1–3 further incorporates fuel injectors 60, 61 axially mounted in substantially opposite portions of the cylinder 10. Additional fuel injectors 62, 63 are mounted in the respective end portions 52, 53. Each of these injectors will normally be connected to a timed source of pressurized fuel (not shown) in a manner well known in the art. Air is supplied to the engine inlet ports 64, 65, 73 by conduit 66 connected to pump 67. Outlet or scavenging ports 68, 69, 70 are connected via conduit 71 to operate turbine 72 which in turn drives the pump 67. Alternatively, pump 67 may be driven from the output shaft 75 or by a separate power source.

Cooling means for the engine shown preferably comprises a pump (not shown) forcing oil through a hollow portion of the shaft 13. The recirculating ball bearing screw may be lubricated and cooled by forcing this oil through small holes in the bottom of the helical grooves 45 and 49. Alternative cooling arrangements well known in the art comprise pumping water or air through the shaft 13, jacketing the cylinder 10 for the circulation of water, or providing outwardly projecting ribs or fins upon the exterior of cylinder 10 for air cooling.

In some embodiments of the engine, it may be desirable to incorporate opposing torsion springs (not shown) at the end of shaft 13. These springs are connected between the shaft 13 and the cylinder 10 and absorb the inertia of the shaft. As a result, these springs relieve a substantial portion of the load from the ball bearing screws each time the shaft 13 is forced to reverse its direction of rotation.

The operation of the engine shown in FIGS. 1–3 is as follows: The engine is started by any convenient means (not shown) such as a reversing starting motor connected to the shaft 13, by emitting compressed air into the cylinder 10, or by an explosive charge detonated within the cylinder. Rotation of the shaft 13 in a clockwise direction (FIG. 2) causes the respective right and left-hand ball bearing screws to translate the pistons 11 and 12 toward each other. The pistons 11 and 12 move toward each other in a central portion in the cylinder because of the reverse threads of the respective ball bearing screws. After the pistons have moved together, fuel is injected by injectors 60 and 61 into the cylinder 10. This fuel is ignited by the highly compressed air between the faces of the opposed pistons. The expansion caused by the combustion within the cylinder drives the pistons to the outer ends of the cylinder 10 and compresses the air entrapped between the respective pistons 11, 12 and cylinder end plates 52, 53. At such time, fuel is injected into the compressed air by injectors 62 and 63. The resulting combustion drives the pistons back toward the center of the cylinder.

At the end of the stroke in which the pistons are brought together, the inlet ports 64, 73 and outlet ports 68, 70 are opened so as to supply fresh air from pump 67 and scavenge the gases within the cylinder. At the ends of the opposite stroke, when the pistons are at respectively opposite ends of the cylinder, the inlet port 65 and outlet port 69 are uncovered for a like scavenging operation.

Each translation of the respective pistons drives shaft 13 in either a clockwise or counterclockwise direction. This rotation of the shaft may be used directly as the engine output or, this reciprocal operation may be converted into continuous rotation in a single direction. For this purpose, two over-running clutches 14 and 15 are included for providing a unidirectional rotational motion of the output shaft 75. As shown, the inner races of clutches 14 and 15 are fixedly connected to shaft 13. The outer race of clutch 15 is fixedly connected to bevel gear 83. This gear is rotatably mounted upon the cylinder end portion 52 and is in engagement with output shaft 75 via gears 84 and 85. Gear 84 is rotatably mounted upon the cylinder housing and gear 85 is fixedly mounted to the outer race of clutch 14. Each of the clutches 14, 15 engages its respective gear for opposite direction of rotation of the shaft 13. Accordingly, gear 85 and thus output shaft 75 is driven either by shaft 13 directly through engaged clutch 14 or (in the same direction) by the rotation of gears 83, 84 through engaged clutch 15.

Specific embodiments for suitable over-run clutches are illustrated by way of example in FIGS. 7 and 8, FIG. 7 illustrating a wind-up spring clutch and FIG. 8 illustrating a preferred sprag clutch. These and other embodiments of one-way clutches are well known in the art. Referring specifically to FIG. 7, the respective ends 77, 78 of spring 76 serve as the inner and outer races of the clutch. When end 77 is driven in a counterclockwise direction with respect to end 78, the respective races are engaged because of the wrap up or wind up of the spring 76. When end 77 is driven in the opposite, or clockwise direction, it will be disengaged from the end 78 because of the unwrapping or unwinding of the spring 76.

Referring now to FIG. 8, the sprag clutch comprises an outer annular race 80 and an inner race 81. A plurality of load transmitting sprags 82 are positioned in the annular space between the two concentric inner and outer races. The engaging surface of each sprag 82 is a roll segment, and the relative positions of the two roll-segments of each sprag (one contacting the outer race, the other contacting the inner race) are so designed that driving rotation of either race makes each sprag wedge securely between the two races. The clutch is then in an engaged condition. Conversely, rotation of a race in the other direction frees the sprags and the clutch is in a disengaged condition. Clutches of this type are manufactured and sold by the Formsprag Company, Warren, Mich. This type of clutch is preferred in the disclosed invention because of its high torque carrying capacity and substantially zero backlash.

Alternative embodiments of engines constructed in accordance with this invention are illustrated in FIGS. 4, 5 and 6. These drawings have been simplified to facilitate the understanding of their respective modes of operation. Particular details such as inlet and outlet valves, fuel injectors, and cooling means not shown will be apparent to those skilled in the art in view of the foregoing detailed description regarding the engine shown in FIGS. 1, 2 and 3.

Referring now to FIG. 4, there is shown a cylinder 89 which encloses a piston 90 having a pair of oppositely threaded ball nuts 91 and 92. These ball nuts engage a pair of oppositely threaded ball screw portions 93 and 94 of output shafts 95 and 96 to form respective ball bearing screws.

As the piston 90 is caused to reciprocate within the cylinder 89, the shafts 95 and 96 are caused to rotate in respectively opposite directions. Either or both of the shafts 95 and 96 may be employed to derive output power from the engine. A preferred arrangement comprises connecting respective ends of the shafts by mating spur gears 97 and 98. A third shaft also coupled to one of the spur gears may be connected to a one-way clutch in the manner shown in FIG. 1, so as to provide an output shaft that rotates in a single direction only. It will be understood that a single piston 90 may be utilized or, alternatively a pair of such pistons mounted within a common cylinder. In the latter instance, the pistons would reciprocate in opposite directions in the same manner as the opposed pistons 11 and 12 of FIG. 1.

The use of the piston 90 shown in FIG. 4 will be especially advantageous when it is desirable or necessary to dispense with the ball splines since the use of two shafts engaging the piston 90 effectively prevent rotation of the piston with respect to the cylinder 89. Another advantage is that the output lead is distributed between two shafts, each of which incorporate a ball bearing screw. The torque requirements for each of these ball bearing screws is therefore less than in an embodiment in which only a single output shaft is employed.

Another embodiment of this invention is shown in FIG. 5 and comprises a cylinder 99 within which is mounted a reciprocating piston 100. A ball nut 101 is rotatably mounted within piston 100 by, for example, respective ball bearings 102, 103 having their inner races affixed to the outside wall of the ball nut and their outer races affixed to the interior wall of piston 100. Integral with the ball nut is an annular sleeve 104 which engages the inner race of a one-way clutch 105. The outer race of the clutch 105 is affixed to the piston 100 and serves to permit rotation of the ball nut 101 in one direction of rotation relative to the cylinder 100. Output shaft 106 is provided with a ball screw 107 which engages the ball nut and is rotatably mounted by bearings mounted at the ends of the cylinder. As in the previous embodiment, a single piston or a pair of pistons operating in opposed relationship in the manner of FIG. 1 may be used in an engine employing the piston 100.

Engines employing the piston noted in FIG. 5 operate in the following manner: One-way clutch 105 operates to prevent rotation of the ball nut 101 relative to the piston 100 during the power stroke, i.e., the ball nut 101 is locked to the piston and drives the output shaft 106. Upon the return stroke, the nut is permitted to rotate relative to the piston so as to rotate with respect to the shaft 106. Accordingly, in this direction of travel, shaft 106 is not driven by the piston 100. The shaft 106 is therefore rotated in one direction only. The necessity for multiple one-way clutches on the output of the shaft is thus obviated.

Since power is delivered from the output shaft during the translation of piston 100 in one direction only, the combustion will normally take place only between the pistons when a pair of pistons such as 100 are reciprocately mounted within a cylinder. The outer chambers are employed only to serve as compression chambers thus effecting a reversal of the direction of the piston at the end of the respective stroke.

In the engine of FIG. 6, a cylinder 115 is divided into four combustion chambers 116, 117, 118 and 119. A piston 120 is mounted between the combustion chambers 116 and 117 and is preferably constructed in the manner of the pistons illustrated in FIG. 1. A similar piston 121 is mounted between the combustion chambers 118 and 119. Each of these pistons incorporate a ball nut engaging a ball screw portion of the shaft 122 which is rotatably mounted upon cylinder dividers 123 and 124 fixedly mounted within the cylinder 115. Ball splines mounted between the interior wall of the cylinder 115 and the exterior walls of the respective pistons 120 and 121 in the manner shown in FIG. 1 prevent the rotation of the pistons relative to the cylinder.

The shaft 122 is affixed to the interior rotors or races of respective one-way clutches 131 and 132. The outer rotor or race of each of the one-way clutches is connected to a respective bevel gear 133, 134 whose teeth engage a common bevel gear 135. Gear 135 is in fixed engagement with an output shaft 136 rotatably mounted in suitable bearings mounted perpendicular to the wall of the cylinder 115.

The operation of the engine shown in FIG. 6 is as follows: A rapid expansion of the gas within chambers 116 and 119 caused for example by ignition of a gasoline and air mixture results in the respective pistons 120 and 121 being driven toward the respective partitions 123 and 124. As in the embodiment of FIG. 1, the ball bearing screws are reverse threaded so that opposite translation of the pistons causes rotation of the shaft 122 in a given dircetion. At such time, one of the one-way clutches 131, 132 locks the respective bevel gear 133 or 134 to the shaft to provide an output rotation of the output shaft 135. At the end of the stroke of the respective pistons 120, 121 a rapid expansion of the gas within the combustion chambers 117, 118 is effected so as to cause each of the pistons to translate toward the outer end walls of the piston 115. The shaft 122 is then caused to rotate in an opposite direction wherein the opposite one-way clutch locks the opposing bevel gear to the shaft. Because of the opposite direction of the shaft 122 and the employment of an opposite bevel gear, the output shaft 135 continues to rotate in the same direction regardless of the translational direction of the pistons 120, 121.

A particular advantage of the engine shown in FIG. 6 is that the power output is derived from the center of the engine. This type of construction facilitates employment of the engine in many applications, specific examples being installation of the engine in the leading edge of an aircraft wing or for use as an outboard motor for a boat.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In an internal combustion engine of the type having its cylinder, piston and shaft concentrically mounted, low friction converting means comprising:
   a cylinder;
   a piston mounted for movement within said cylinder;
   a ball bearing nut rotatably mounted within said cylinder;
   means for locking said ball bearing nut to said piston when said ball bearing nut is urged to rotate in one direction with respect to said piston and for releasing the ball bearing nut with respect to said piston when said ball bearing nut is rotated in the opposite direction with respect to said piston;
   a shaft having a helically threaded portion cooperating with said ball nut to form a ball bearing screw; and
   means for rotatably mounting said shaft within said cylinder.

2. In an internal combustion engine of the type having its cylinder, piston and shaft concentrically mounted, low friction converting means comprising:
   a closed cylinder having a longitudinal axis;
   a longitudinally oriented shaft rotatably mounted at each end of said cylinder;
   a piston having cylindrical ends disposed in said cylinder with said shaft extending through the ends thereof; and
   a plurality of ball bearing raceways formed between selected adjacent surfaces of said cylinder, shaft and the intermediate part of said piston to fully convert reciprocating motion of said pistons into rotary movement of said shaft.

3. Low friction converting means in accordance with claim 1 wherein at least one of said raceways includes a helical passageway formed by complementary surfaces of an intermediate shoulder and an intermediate section of said shaft and said piston, respectively.

4. In a double-acting internal combustion engine of the type having its cylinder, piston and shaft concentrically mounted, low friction means for fully converting the reciprocating motion of the piston into shaft rotation comprising:
   an elongate cylinder having a longitudinal axis;
   a longitudinally oriented shaft having an enlarged shoulder intermediate its ends mounted at the ends of said cylinder for rotation in said cylinder;
   a double-acting piston having cylindrical end sections and a reduced radii intermediate section disposed in said cylinder with said shaft extending through the end sections thereof;

at least one longitudinally apertured ball nut held intermediate the end sections of said piston and encompassing the intermediate shoulder of said shaft;

said ball nut in combination with the intermediate shoulder on said shaft providing a closed helical raceway;

a plurality of ball bearings in said closed raceway to convert the reciprocating motion of said piston to shaft rotation; and other ball bearing means including the intermediate section of said piston which act to prevent said piston from rotating with respect to said shaft and said cylinder.

5. In an internal combustion engine of the type having its cylinder, piston and shaft concentrically mounted, low friction means for positively converting the reciprocating motion of the piston into shaft rotation comprising:

a cylinder having a longitudinal axis;
a piston disposed in said cylinder;
a longitudinally oriented shaft rotatably mounted at the ends of said cylinder and extending through said piston;
a longitudinally apertured ball nut affixed interior of said piston and encircling a section of said shaft;
said ball nut in combination with the section of said shaft providing a closed helical raceway;
a plurality of ball bearings disposed in said raceway to convert the reciprocating motion of said piston to rotation of said shaft; and,
a plurality of two-piece ball bearing splines associated with an intermediate part of said piston and said cylinder, one part of said splines disposed in radial slots in the wall of said cylinder and the other parts removably inserted in the walls of said piston.

6. Ball bearing converting means for engines employing a double-acting piston and a shaft concentric therewith comprising, in combination, a cylinder having a longitudinal axis;
a double-acting piston having cylindrical ends and an intermediate reduced radii section supported in said cylinder;
a plurality of peripherally spaced apart keyways formed by complementary longitudinal grooves in adjacent surfaces of the intermediate section of said piston and the interior of said cylinder, a recirculating conduit interconnecting the ends of each raceway formed by each pair of complementary grooves and a plurality of ball bearings enclosed in each closed raceway to key the piston to the cylinder under rolling frictional contact;
a longitudinally oriented shaft having an enlarged radii intermediate shoulder with a helical groove inscribed therein;
means journalling said shaft at the ends of said cylinder with said shoulder disposed interior of said piston; and
a longitudinally apertured ball nut held between the ends of said piston interior of said intermediate section and encompassing the intermediate shoulder of said shaft;
said ball nut having a helical groove formed in its inner surface complementary to the groove inscribed in the shoulder of said shaft, a recirculating conduit interconnecting the ends of the raceway formed by the complementary helical grooves and a plurality of ball bearings disposed in the closed helical raceway to translate the reciprocating motion of the piston to shaft rotation under rolling frictional contact.

7. Ball bearing converting means for engines employing a double-acting piston and a shaft concentric therewith comprising:

a closed-end cylinder having a longitudinal axis and a plurality of longitudinal slots formed in the wall thereof at peripherally spaced-apart locations;
a double-acting piston supported for movement in said cylinder;
said piston having cylindrical ends and peripherally spaced-apart intermediate sections, each of said intermediate sections having a longitudinal slot formed therein which underlie the slots formed in the wall of said cylinder;
a plurality of splines, each having longitudinal grooves interconnected by recirculating conduits and including a plurality of ball bearings, adapted to fit into the slots in said cylinder wall so that the ball bearings ride in the raceway formed by the complementary longitudinal grooves of the spline and an intermediate section of said piston;
a shaft having an enlarged diameter shoulder intermediate its ends extending through said piston and rotatably mounted coincident with said longitudinal axis;
said shoulder having a continuous helical groove formed in its outer surface; and,
a longitudinally apertured ball nut held between the ends of said piston to encircle the intermediate section of said shaft;
said ball nut having a helical groove formed in its inner surface which coincides with the groove in the shoulder of said shaft, a recirculating conduit interconnecting the ends of its helical groove and a plurality of ball bearings disposed in the closed helical raceway.

8. In an internal combustion engine of the type having its cylinder, piston and shaft concentrically mounted, low friction converting means comprising:

a cylinder having a longitudinal axis;
a piston mounted for movement within said cylinder;
first and second radially displaced ball bearing nuts mounted by said piston;
first and second shafts each having a helically threaded portion cooperating with respective ones of said ball nuts and a plurality of ball bearings to form first and second ball bearing screws;
said first and second ball bearing nuts and said shafts being reversely threaded so that said shafts are caused to rotate in opposite directions for a given translational movement of said piston within said cylinder; and,
means for rotatably mounting each of said shafts within said cylinder parallel to said longitudinal axis.

References Cited by the Examiner

UNITED STATES PATENTS

| | | | |
|---|---|---|---|
| 829,279 | 8/06 | Mears | 74—127 |
| 1,072,701 | 9/13 | Collins | 74—127 |
| 1,094,972 | 4/14 | Bocorselski | 308—6 |
| 1,693,024 | 11/28 | Drummond | 123—58 |
| 1,719,562 | 7/29 | Sala et al. | 123—58 |
| 1,963,780 | 6/34 | Du Bois | 60—13 |
| 2,067,288 | 1/37 | Riehm | 60—13 |
| 2,197,155 | 4/40 | Nardone | 92—33 |
| 2,569,542 | 10/51 | Skidmore | 74—127 |
| 2,674,899 | 4/54 | Gobereau | 74—459 |
| 2,987,888 | 6/61 | Crowell | 92—166 |
| 3,045,457 | 7/62 | Blanchard et al. | 308—6 |
| 3,046,808 | 7/62 | De Mart | 74—89 |
| 3,068,714 | 12/62 | Davis | 74—459 |

FRED E. ENGELTHALER, *Primary Examiner.*